(12) United States Patent
Renaud et al.

(10) Patent No.: US 10,648,098 B2
(45) Date of Patent: May 12, 2020

(54) PLASTIC PART WITH SELECTIVE METALLIZATION AND CORRESPONDING MANUFACTURING PROCESS

(71) Applicant: VALEO SECURITE HABITACLE, Creteil (FR)

(72) Inventors: Olivier Renaud, Creteil (FR); Benoît Delande, Creteil (FR)

(73) Assignee: VALEO SECURITE HABITACLE, Créteil (FR)

( * ) Notice: Subject to any disclaimer, the term of this patent is extended or adjusted under 35 U.S.C. 154(b) by 128 days.

(21) Appl. No.: 15/927,571

(22) Filed: Mar. 21, 2018

(65) Prior Publication Data

US 2018/0274117 A1    Sep. 27, 2018

Related U.S. Application Data

(62) Division of application No. 14/126,045, filed as application No. PCT/EP2012/062670 on Jun. 29, 2012, now abandoned.

(30) Foreign Application Priority Data

Jun. 29, 2011 (FR) ...................... 11 02021

(51) Int. Cl.
| C25D 5/54 | (2006.01) |
| B32B 15/088 | (2006.01) |
| C08L 77/00 | (2006.01) |
| C25D 5/56 | (2006.01) |
| C25D 5/02 | (2006.01) |
| B32B 27/08 | (2006.01) |
| C25D 3/04 | (2006.01) |

(52) U.S. Cl.
CPC .............. *C25D 5/54* (2013.01); *B32B 15/088* (2013.01); *B32B 27/08* (2013.01); *C08L 77/00* (2013.01); *C25D 5/02* (2013.01); *C25D 5/56* (2013.01); *C25D 3/04* (2013.01); *Y10T 428/24802* (2015.01); *Y10T 428/24917* (2015.01)

(58) Field of Classification Search
CPC .... C25D 5/02; C25D 5/54; C25D 5/56; Y10T 428/24802; Y10T 428/24917
See application file for complete search history.

(56) References Cited

U.S. PATENT DOCUMENTS 4,758,855 A * 7/1988 Tamamura .............. B29C 70/68
16/379

FOREIGN PATENT DOCUMENTS

JP        2008098014 A  *  4/2008

* cited by examiner

*Primary Examiner* — Gerard Higgins
(74) *Attorney, Agent, or Firm* — Osha Liang LLP

(57) ABSTRACT

The present invention relates to a plastic part (1) with selective metallization comprising at least one first non-metallized portion (7) made from a first plastic material that cannot be metallized by electroplating and at least one second metallized portion (9) made from a second metallizable plastic material, the first plastic material being a mixture of polycarbonate and of a semiaromatic polyester and the second plastic material being a polyamide.

12 Claims, 1 Drawing Sheet

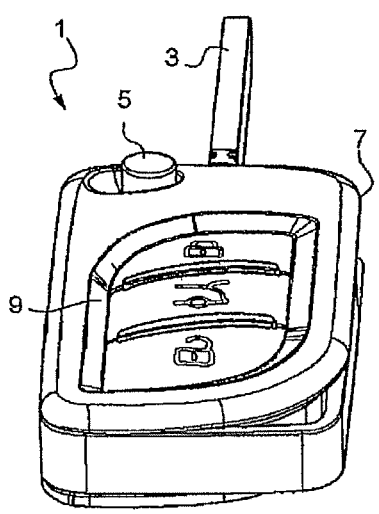

PLASTIC PART WITH SELECTIVE METALLIZATION AND CORRESPONDING MANUFACTURING PROCESS

CROSS-REFERENCE TO RELATED APPLICATIONS

This application claims the benefit, pursuant to 35 U.S.C. § 120, to U.S. patent application Ser. No. 14/126,045 filed on Dec. 13, 2013, which is a National Stage Entry of PCT/EP2012/062670 filed on Jun. 29, 2012, which claims priority to French Application No. 11/02021 filed on Jun. 29, 2011, which are herein incorporated by reference.

DESCRIPTION

The present patent application relates to the field of plastic parts with selective metallization and more particularly to plastic parts with selective metallization in the field of the motor vehicle industry.

Plastic parts with selective metallization are generally composed of one or more metallized portions made from a plastic material and of one or more nonmetallized portions made from another plastic material.

For these plastic parts with selective metallization, the metallized plastic material used is generally acrylonitrile/butadiene/styrene (ABS) and the nonmetallized plastic material used is generally polycarbonate (PC). It is also common to use, as metallized plastic material, an acrylonitrile/butadiene/styrene (ABS) coupled with polycarbonate (PC) mixture.

It is advantageous to use these different materials as ABS or the ABS/PC mixture is easy to metallize by electroplating and PC has a good chemical resistance to the baths used during the process of metallization of the ABS or ABS/PC mixture.

Nevertheless, the mechanical properties of PC are sometimes insufficient to meet the mechanical requirements related to the use of certain parts but also the mechanical requirements laid down by the clients, in particular if the example is taken of a plastic shell of a motor vehicle identifier, for example a hands-free device or a key, in which an unfoldable insert mechanism is positioned.

In the latter case, it is advantageous to use a polyamide (PA) which has an isostatic modulus of elasticity of the order of 7500 MPa and a strain at break of 135 MPa. However, polyamide (PA) cannot be used in the context of selective metallization of the shell of the motor vehicle identifier as it is damaged by the baths used during the metallization process.

One solution would thus be to use ABS for the metallized portions of the shell of the motor vehicle identifier and PC for the nonmetallized portions. However, PC has an isostatic modulus of elasticity of the order of 2400 MPa and a strain at break of 68 MPa. PC is thus much less resistant to impacts and much more deformable than PA and does not meet the requirements of the manufacturers.

It is therefore inadvisable to use such material to produce a motor vehicle identifier shell having selective metallization if it is desired to retain the mechanical properties laid down by the manufacturers for plastic parts of this type.

One of the aims of the invention is thus to at least partially overcome the disadvantages of the prior art and to provide a plastic part with selective metallization corresponding to elevated mechanical properties.

The present invention thus relates to a plastic part with selective metallization comprising at least one first nonmetallized portion made from a first plastic material and at least one second metallized portion made from a second plastic material, the first plastic material being a semiaromatic polyester mixed or not mixed with polycarbonate and the second plastic material being a polyamide.

According to one aspect of the invention, the semiaromatic polyester is chosen from polyethylene terephthalate and polybutylene terephthalate.

According to another aspect of the invention, the first plastic material is reinforced by the addition of filler of glass fiber or glass bead type.

According to another aspect of the invention, the metallization metal used for the metallization of the plastic part is chromium or nickel.

According to another aspect of the invention, said plastic part is a shell of a motor vehicle identifier.

The invention also relates to a process for the manufacture of a plastic part with selective metallization, comprising the following stages:
  providing a plastic part comprising at least one first portion made from a semiaromatic polyester mixed or not mixed with polycarbonate and at least one second portion made from a polyamide,
  electroplating the part in order to obtain selective metallization of the second portion.

Other characteristics and advantages of the invention will become more clearly apparent on reading the following description, given by way of illustrative and nonlimiting example, and FIG. 1, representing a plastic part with selective metallization.

FIG. 1 shows a plastic part 1 with selective metallization comprising at least one first nonmetallized portion 7 and at least one second metallized portion 9.

The example of plastic part 1 illustrated by FIG. 1 is a motor vehicle identifier, more specifically a key comprising a key bit 3, a plastic shell comprising a first nonmetallized portion 7, a metallized part 9 and a push button 5 for controlling the key bit 3.

The first nonmetallized portion 7 is made from a first plastic material, such as a semiaromatic polyester mixed or not mixed with polycarbonate, said semiaromatic polyester advantageously being chosen from polyethylene terephthalate (PET) and polybutylene terephthalate (PBT), due to their mechanical properties and properties of resistance to chemical attacks.

The mechanical properties of this first material can be enhanced by adding thereto fillers of glass fiber or glass bead type.

It is thus possible to obtain, for example for a PC/PBT/glass fiber mixture, an isostatic modulus of elasticity of the order of 10 000 MPa and a strain at break of 130 MPa.

The second metallized portion 9 is made from a second plastic material, such as a polyamide (PA).

The metallization of the PA by electroplating requires the use of baths which are much less corrosive than for the metallization of ABS; thus, the first portions 7 made of semiaromatic polyester mixed or not mixed with polycarbonate have less risk of being attacked and damaged during the electroplating of the plastic part.

The present invention also relates to a process for the manufacture of a plastic part 1 with selective metallization, comprising the following stages:
  providing a plastic part 1 comprising at least one first portion 7 made from a semiaromatic polyester mixed or not mixed with polycarbonate and at least one second portion 9 made from a polyamide, the electroplating of the plastic part 1 in order to obtain selective metallization of the second portion or portions 9.

During the manufacture of the plastic part 1, at least one first nonmetallized portion 7 is made from a semiaromatic polyester mixed or not mixed with polycarbonate, advantageously chosen from PET or PBT. The semiaromatic polyester mixed or not mixed with polycarbonate can also be reinforced by the addition of fillers of glass fiber or glass bead type.

Still during the manufacture, at least one second metallized portion 9 is made of PA.

As shown by FIG. 1, there may very obviously be one or more portions 7, 9 of each material on the same plastic part 1, according to the requirements related to the use of the plastic part 1, according to esthetic criteria or else according to the criteria defined by the client.

The different portions 7, 9 can be produced separately and then assembled to form the plastic part 1 or certain portions 7, 9 can be overmolded onto others or else produced simultaneously according to methods well known to a person skilled in the art, this being a function of the final plastic part 1 and of the result desired after metallization.

During the electroplating, the plastic part 1 passes through different baths, making it possible to apply, by means of a direct electrical current, a metal deposition at the surface of the plastic part 1 on the second portion or portions 9 made of polyamide, the metal being initially in the form of cations in solution in a solvent.

Generally, out of concern for attractiveness and protection, the selective metallization is a deposition of chromium on the second portion or portions 9 made of polyamide. In another embodiment, the deposition of chromium is replaced by a deposition of nickel.

Thus, by virtue of the mechanical and chemical properties of these materials, it is possible to obtain a plastic part 1 with selective metallization itself having sufficient mechanical properties to be suitable, for example, for the preparation of a shell of a motor vehicle identifier.

The invention claimed is:

1. A process for manufacturing a plastic part with selective metallization, comprising the following stages:
   providing a plastic part comprising at least one first nonmetallized portion made from a mixture of polycarbonate and a semiaromatic polyester and at least one second portion made from a polyamide,
   electroplating the plastic part in order to obtain selective metallization of the second portion;
   wherein the mixture of the polycarbonate and the semiaromatic polyester is reinforced by the addition of filler of a glass bead.

2. The manufacturing process as claimed in claim 1, wherein the semiaromatic polyester is chosen from polyethylene terephthalate and polybutylene terephthalate.

3. The manufacturing process as claimed in claim 1, wherein the metal deposited during the metallization is chromium.

4. The method of claim 1, wherein electroplating the plastic part comprises:
   passing the plastic part through a plurality of baths;
   depositing a metal on the second portion of the plastic part.

5. The manufacturing process as claimed in claim 4, wherein the metal is provided in a solution.

6. The manufacturing process as claimed in claim 1, wherein the at least one first nonmetallized portion and the at least one second portion are produced simultaneously or separately.

7. A process for manufacturing a plastic part with selective metallization, comprising the following stages:
   providing a plastic part comprising at least one first nonmetallized portion made of a semiaromatic polyester and at least one second portion made from a polyamide,
   electroplating the plastic part in order to obtain selective metallization of the second portion;
   wherein the semiaromatic polyester is reinforced by the addition of filler of a glass bead.

8. The manufacturing process as claimed in claim 7, wherein the semiaromatic polyester is chosen from polyethylene terephthalate and polybutylene terephthalate.

9. The manufacturing process as claimed in claim 7, wherein the metal deposited during the metallization is chromium.

10. The method of claim 7, wherein electroplating the plastic part comprises:
    passing the plastic part through a plurality of baths;
    depositing a metal on the second portion of the plastic part.

11. The manufacturing process as claimed in claim 10, wherein the metal is provided in a solution.

12. The manufacturing process as claimed in claim 7, wherein the at least one first nonmetallized portion and the at least one second portion are produced simultaneously or separately.

* * * * *